United States Patent
Nakai et al.

[11] Patent Number: 6,146,533
[45] Date of Patent: Nov. 14, 2000

[54] METHOD OF TREATING WASTEWATER CONTAINING CHEMICAL SUBSTANCES BY USE OF SUPERCRITICAL FLUID AND TREATING APPARATUS

[75] Inventors: Toshihiro Nakai; Yoshio Sato; Nobuyuki Takahashi; Yoshishige Kato, all of Tsukuba, Japan

[73] Assignee: Director-General of Agency of Industrial Science and Technology, Tokyo, Japan

[21] Appl. No.: 09/280,547

[22] Filed: Mar. 30, 1999

[30] Foreign Application Priority Data

Aug. 31, 1998 [JP] Japan ................................. 10-244541

[51] Int. Cl.⁷ .................................................. C02F 1/04
[52] U.S. Cl. ........................... 210/634; 210/744; 210/86; 210/205; 203/39
[58] Field of Search .................................. 210/634, 739, 210/744, 86, 195.1, 205, 252, 259; 203/39

[56] References Cited

U.S. PATENT DOCUMENTS

| | | | |
|---|---|---|---|
| 4,349,415 | 9/1982 | DeFilippi et al. | 203/14 |
| 4,877,530 | 10/1989 | Moses | 210/511 |
| 5,312,549 | 5/1994 | String et al. | 210/634 |

FOREIGN PATENT DOCUMENTS

| | | |
|---|---|---|
| 62-56319 | 3/1987 | Japan . |
| 2184388 | 7/1990 | Japan . |
| 6269909 | 2/1994 | Japan . |

OTHER PUBLICATIONS

Rice, Paul N., *Near Critical CO₂ Extraction of Hazardous Organics From Acrylonitrile, Pesticide and Steel Mill Wastes*, U.S. Department of Commerce National Technical Information Services, EPA/600/2–87/005, Jan. 1987, pp. iv.–vi. and 1–21 with Abstract.

*Primary Examiner*—David A. Simmons
*Assistant Examiner*—Betsey J. Morrison
*Attorney, Agent, or Firm*—Birch, Stewart, Kolasch & Birch, LLP

[57] ABSTRACT

There is disclosed a method and an apparatus, of treating wastewater containing chemical substances, which comprises passing, into a continuous phase of water to be treated that has been formed by supplying raw water from an upper part of a tower, a supercritical fluid, from a lower part of the tower, to the upper part thereof, to bring the water to be treated and the supercritical fluid in countercurrent contact with each other, thereby separating the chemical substances from the water to be treated. These method and apparatus make it possible to treat wastewater containing chemical substances at a medium concentration, for which conventionally an effective physical or chemical treatment method is not found, efficiently without involvement of any secondary pollution.

12 Claims, 3 Drawing Sheets

METHOD OF TREATING WASTEWATER CONTAINING CHEMICAL SUBSTANCES BY USE OF SUPERCRITICAL FLUID AND TREATING APPARATUS

FIELD OF THE INVENTION

The present invention relates to a method and an apparatus for separating and removing chemical substances from wastewater by use of a supercritical fluid.

BACKGROUND OF THE INVENTION

As a representative form of clarification treatment of wastewater, there is microbial degradation treatment, including, for example, the activated sludge method. However, wastewater also contains substances that are difficult to decompose with microorganisms, and to remove such contaminants, the wastewater is required to be separately treated, physically or chemically.

Such physical or chemical treatment methods include, for example, the absorption method, the photooxidation method, and the combustion method, but the absorption method and the photooxidation method are only effective when the wastewater is a low-concentration wastewater, and the combustion method is only effective when the wastewater is a very-high-concentration wastewater. Hence, in the case of a medium-concentration wastewater, which cannot effectively be treated by these methods, the wastewater is evaporated first by a drum dryer, to be concentrated, and then it is treated by the combustion method. Since this method is, however, high in running cost of the evaporation and concentration treatment, there is a demand for development of a method and apparatus that can treat medium-concentration wastewater directly.

Further, in the case of a method wherein pollutants in wastewater are removed by decomposition, there is a possibility of different pollution by secondary formation of chemical substances, and therefore it is desired to develop a wastewater treatment method free from any risk of secondary pollution.

If pollutants can be separated from wastewater without decomposing them, secondary pollution due to the treatment does not occur. As a solvent that can separate chemical substances from a medium-concentration aqueous solution, there are supercritical fluids used for the separation of water-alcohol in the field of biomass, but there are very few instances of their use in wastewater treatment, and they are accompanied by the problem that they are poor in treatment efficiency. Namely, there is a method in which a supercritical fluid is fed from below, and wastewater is fed from above in a countercurrent contact tower 31, sectioned by sieve trays 32, as shown in FIG. 3(a), or a countercurrent contact tower 33, loaded with Dixon packings 34, as shown in FIG. 3(b), but the treatment efficiency in either method of the method is low, and the method is not suitable for treating a large quantity of wastewater.

SUMMARY OF THE INVENTION

Therefore, an object of the present invention is to provide a method of treating wastewater containing chemical substances at a medium concentration, for which conventionally an effective physical or chemical treatment method is not found, efficiently without involvement of any secondary pollution, by use of a supercritical fluid.

Further, another object of the present invention is to provide a treating apparatus that can treat a medium concentration wastewater directly, and that can also treat a large amount thereof by efficiently separating chemical substances.

Other and further objects, features, and advantages of the invention will appear more fully from the following description, taken in connection with the accompanying drawings.

BRIEF DESCRIPTION OF THE DRAWINGS

FIG. 2(a) shows the state wherein the backflow is detected, and FIG. 2(b) shows the restored state; FIG. 3(a) shows one having sieve trays therein, and FIG. 3(b) shows one having Dixon packings therein.

DETAILED DESCRIPTION OF THE INVENTION

Figure 1:
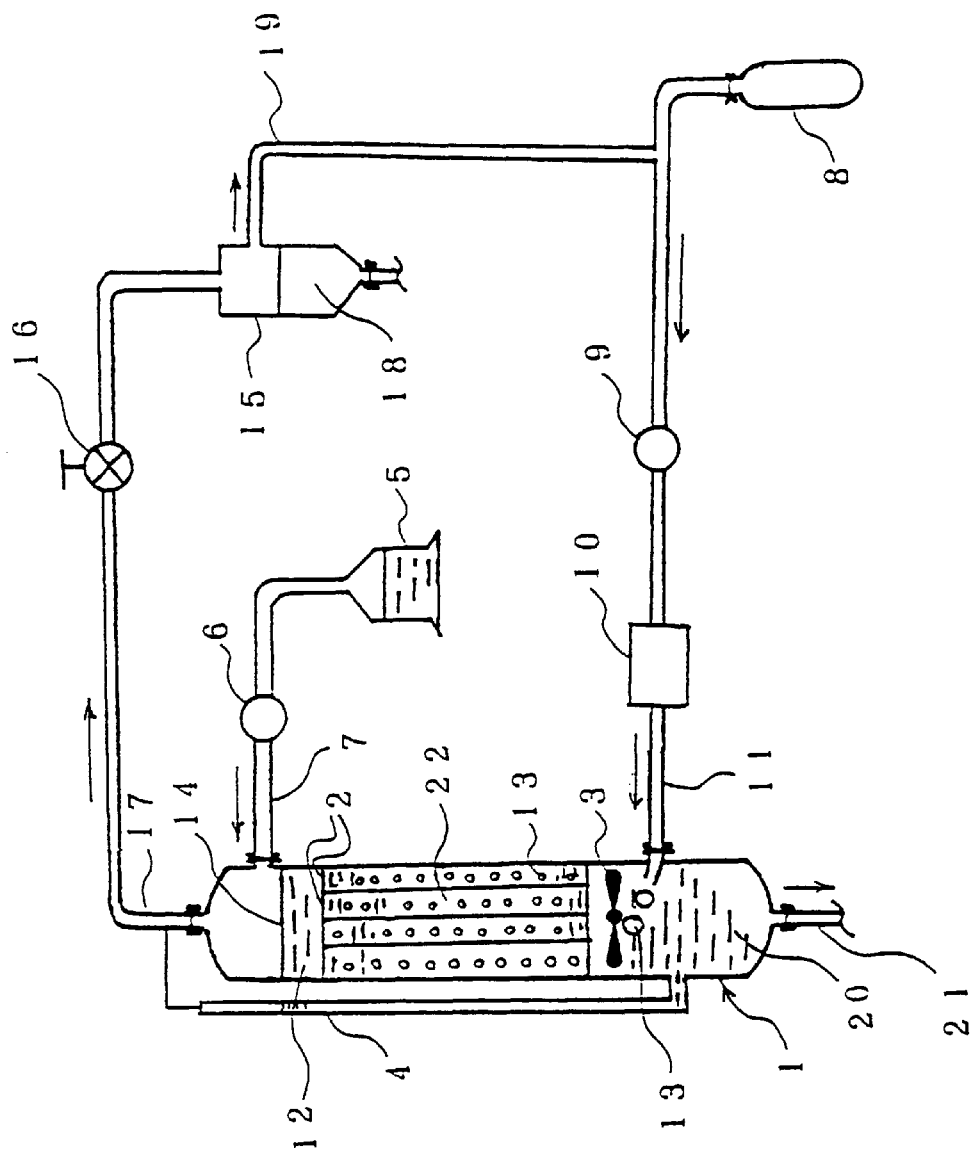
FIG. 1 is an illustrative diagram showing an embodiment of the treating method and the treating apparatus of the present invention.

In view of the above objects, the inventors of the present invention, having investigated intensively, have found that, unlike the conventional method, wherein countercurrent contact is carried out with a supercritical fluid being in the state of a continuous phase, or with water to be treated being in the state of a less continuous phase, a phase of water to be treated is continuously formed almost throughout the inside of a tower, and a supercritical fluid is fed thereinto, to come in contact therewith, and thereby a large amount of wastewater containing chemical substances can be treated efficiently, which finding has led to the present invention.

That is, according to the present invention, there are provided:

(1) A method of treating wastewater containing chemical substances, comprising passing, into a continuous phase of water to be treated that has been formed by supplying raw water from an upper part of a tower, a supercritical fluid, from a lower part of the tower, to the upper part thereof, to bring the water to be treated and the supercritical fluid in countercurrent contact with each other, thereby separating the chemical substances from the water to be treated;

(2) The method of treating wastewater containing chemical substances as stated in the above (1), wherein the tower has longitudinally therein at least one slender column with a cross-sectional area of 30 $cm^2$ or less;

(3) The method of treating wastewater containing chemical substances as stated in the above (1) or (2), further comprising stirring the supercritical fluid in the lower part of the tower;

(4) The method of treating wastewater containing chemical substances as stated in the above (1), (2), or (3), further comprising detecting and preventing any backflow of the water to be treated from the tower in the supply of the supercritical fluid;

(5) An apparatus for treating wastewater containing chemical substances, which comprises a tower, in which tower raw water can be supplied from an upper part thereof, a supercritical fluid can be supplied from a lower part thereof, treated water can be discharged from the lower part, and the supercritical fluid containing chemical substances can be discharged from the upper part, and which comprises a means capable of controlling the water level in the tower to a certain level, wherein the tower can form therein a continuous phase of water to be treated, and the water to be treated in the form of the continuous phase and the supplied supercritical fluid are brought in countercurrent contact with each other, thereby separating the chemical substances from the water to be treated;

(6) The apparatus for treating wastewater containing chemical substances as stated in the above (5), wherein the tower has longitudinally therein at least one slender column with a cross-sectional area of 30 cm$^2$ or less;

(7) The apparatus for treating wastewater containing chemical substances as stated in the above (5) or (6), further comprising a means of stirring the supercritical fluid in the lower part of the tower; and (8) The apparatus for treating wastewater containing chemical substances as stated in the above (5), (6), or (7), further comprising a means of detecting and preventing any backflow of the water to be treated from the tower, to a pump for supplying the supercritical fluid, in the supply of the supercritical fluid.

Meantime, in the present invention, the wastewater containing chemical substances (hereinafter referred to simply as wastewater) includes a wide range of aqueous solutions of chemical substances, such as polluted water containing chemical substances; the raw water refers to wastewater that has not been treated, and the treated water refers to treated wastewater that has had chemical substances removed. The water to be treated includes all of raw water, treated water, and wastewater that is being treated, and the continuous phase of the water to be treated refers to a continuous phase having a concentration gradient that ranges from the concentration of raw water to the concentration of treated water.

The wastewater that can be treated with the method and the apparatus of the present invention is, preferably, wastewater containing chemical substances that are difficult to treat by decomposition with microorganisms, and it specifically includes wastewater containing chemical substances, including organic compounds, such as aromatic nitro compounds, aromatic chlorine compounds, and organic chlorine-series solvents. The present invention is suitable for treating wastewater having a not-too-low concentration, preferably wastewater wherein the total concentration of chemical substances to be separated is 100 mg/liter or more, and more preferably wastewater wherein the total concentration of chemical substances to be separated is 100 mg/liter to 10,000 mg/liter.

The chemical substances that can be separated from wastewater by the method or the apparatus of the present invention are those that are soluble in the supercritical fluid that is used, and examples are those that are difficult to decompose with microorganisms, such as aromatic nitro compounds (e.g. nitrobenzene, nitrotoluene, and nitrophenol), aromatic chlorine compounds (e.g. chlorophenol), and organic chlorine-series solvents (e.g. trichloroethylene and tetrachloroethylene).

In the present invention, as the supercritical fluid, a supercritical fluid, for example, of carbon dioxide, dinitrogen oxide, carbon disulfide, ethane, ethylene, or propane can be used. Supercritical carbon dioxide is particularly preferable because, for example, the supercritical conditions are relatively moderate, and it is not toxic.

In the present invention, into a countercurrent contact tower, wherein a continuous phase of water to be treated is formed therein, are supplied raw water from an upper part thereof, and a supercritical fluid from a lower part thereof, and they are brought in countercurrent contact with each other in the tower, to treat the raw water.

In the present invention, preferably the continuous phase of the water to be treated that is formed in the tower has a cross-sectional area of 30 cm$^2$ or less, more preferably 2 to 20 cm$^2$, and further preferably 4 to 10 cm$^2$. If the cross-sectional area is too large, the water to be treated circulates longitudinally by convection and therefore is stirred, so that the formation of the concentration gradient in the longitudinal direction is disturbed, and the treatment efficiency becomes poor, sometimes. Although a slender column having such a cross-sectional area may be used itself as a countercurrent contact tower, when a plurality of slender columns are used to section the inside of a tower longitudinally, so that a group of aqueous phases of water to be treated that have a prescribed cross-sectional area may be formed in the tower, the treatment efficiency is not lowered, even if the tower is made large to increase the cross-sectional area of the tower itself. The cross-sectional shape of the slender column is not particularly restricted and may, for example, be circular, polygonal, or regularly polygonal. If a plurality of slender columns are used to be loaded in the tower, preferably they are ones that can divide the inside of the tower as uniformly as possible. The cross-sectional shape of the tower is not particularly restricted and may, for example, be circular, polygonal, or regularly polygonal. Preferably the cross-sectional shape of the tower is one that allows the supercritical fluid to go throughout the inside of the tower uniformly, and preferably, for example, the positions and the number of the supply ports of the supercritical fluid, and the position and the shape of the stirring means, are suitably selected and adjusted in accordance with the cross-sectional area of the tower.

The longer the length of the continuous phase of the water to be treated is, the longer the contact time between them becomes. Taking the treatment efficiency and the actual operation into consideration, the length of the continuous phase of the water to be treated is generally 1 to 10 m, preferably 2 to 5 m, and more preferably 3 to 4 m. The distance (water level) from the lowest part of the tower to the level of the water to be treated is controlled by the generally performed water level control method, so that the distance may be constant at the value like the above.

Although the ratio of the water to be treated to the supercritical fluid in the countercurrent contact in the present invention varies depending on the types and concentrations of chemical substances contained in wastewater, it is generally from 0.3 to 10, and preferably from 1 to 3, in terms of the S/F value (the ratio of the supply rate of the raw water to the supply rate of the supercritical fluid). Although the supply rate of raw water varies depending on the types and concentrations of chemical substances contained in wastewater, preferably it is from 1 to 5, in terms of the SV value (the ratio of the amount of the raw water to be supplied per hour to the internal volume of the tower). The pressure at the time of the treatment is suitably set depending on the type of the supercritical fluid, and, for example, in the case of carbon dioxide, the pressure is generally 80 to 350 kg/cm$^2$, and preferably 80 to 100 kg/cm$^2$. The temperature at the time of the treatment varies depending on the type of the supercritical fluid, and, for example, in the case of carbon dioxide, the treatment is carried out generally at a temperature of 30 to 40° C.

Now, a preferable embodiment of the method and the apparatus of the present invention are described with reference to the drawings.

FIG. 1 is an illustrative diagram showing schematically an embodiment of the method and the apparatus of the present invention. In the figure, 1 indicates a countercurrent contact tower, whose inside is divided longitudinally by slender columns 2, and the lower part of the countercurrent contact tower 1 is provided with stirring blades 3, as a stirring means. Raw water 12 is sucked from a raw water tank 5 by a pump 6, and it is supplied through a pipe 7 into the tower 1. The level of the liquid surface 14 of the raw water 12 is controlled by a level gauge 4. A supercritical fluid 13 from a cylinder 8 is sucked and pressurized by a pressurizing pump 9 for supercritical fluids, to be supplied through a pipe 11 into the tower 1. When a backflow-preventive apparatus 10 provided along the pipe 11 detects any backflow of at least a given amount of water 22 to be treated (including 20 and 12 also), it stops the raw water pump 6, and then, when the amount of the backflow decreases to less than the given value, it restarts the raw water pump 6. The supplied supercritical fluid 13 is stirred by the stirring blades 3, to be dispersed uniformly and finely, and it is fed into the slender columns 2. The treatment temperature, the treatment pressure, and the like are measured by measuring means (not shown) and are controlled so that prescribed conditions may be attained.

The treated water 20 that has been brought in contact with the supercritical fluid 13, to be freed from chemical substances, is discharged through a pipe 21. On the other hand, the supercritical fluid containing chemical substances is discharged through a pipe 17, and it is recovered into a pressure reduction condensation tank 15, after the pressure thereof is reduced by a pressure-reducing valve 16. The supercritical fluid vaporized in the tank 15 is separated from chemical substances 18 and is reused through a pipe 19.

In the method and the apparatus of the present invention, in order to improve the efficiency of the contact between the water to be treated and the supercritical fluid, preferably the supercritical fluid is stirred at the lower part of the tower, particularly at the lower part below the slender columns, to be dispersed finely and uniformly, and it is brought to the countercurrent contact. Although FIG. 1 shows, as an example, one that uses stirring blades, any means can be used, as long as it can disperse the supercritical fluid finely. Further, although the example shown in FIG. 1 uses a level gauge for the control of the water level in the tower, any generally used water level control means, such as a differential pressure transmitter and overflow, can be used, without any particular limitation.

Figure 2:
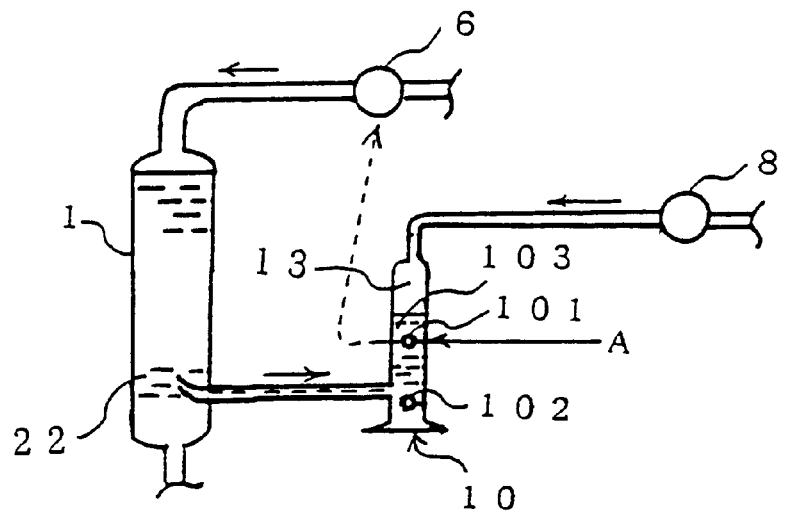
FIGS. 2(a) and 2(b) are illustrative diagrams showing an embodiment of a backflow-preventive apparatus in the present invention.
Figure 2:
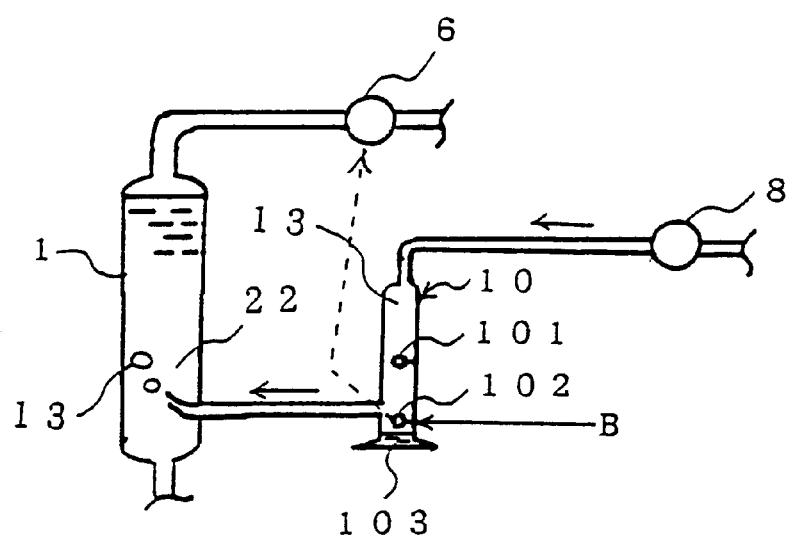
Figure 3:
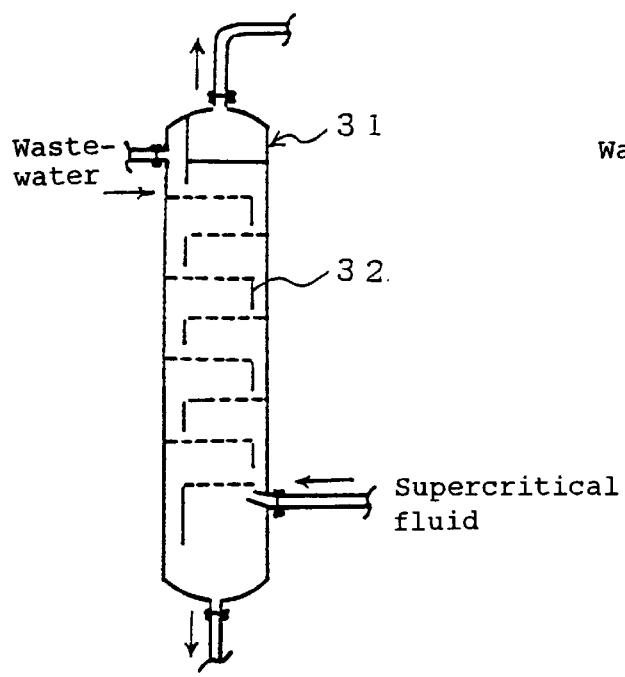
FIGS. 3(a) and 3(b) are illustrative diagrams showing conventional wastewater/supercritical fluid countercurrent contact towers.
Figure 3:
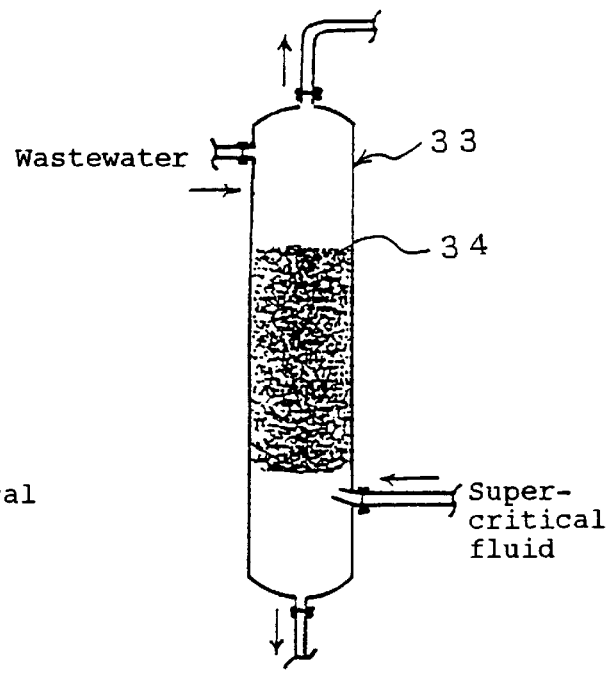

Further, in the method and the apparatus of the present invention, when the water to be treated flows back from the tower to the supply pipe of the supercritical fluid, in some cases a problem, such as malfunction of the pump, occurs due to clathrate compounds formed as a result of the reaction between the water to be treated and the supercritical fluid. Therefore, in the present invention, preferably any backflow of the water to be treated is detected and prevented in the supply process of the supercritical fluid. Illustrative diagrams of the backflow-preventive apparatus 10 shown in FIG. 1 are shown in FIGS. 2(a) and 2(b). FIG. 2(a) shows the state wherein the water 22 to be treated has flowed back from the tower 1, in which, when a sensor 101 of the backflow-preventive apparatus 10 detects inflow water 103 to be treated, in an amount of at least the water level A, the raw water pump 6 is stopped. In the backflow-preventive apparatus 10, owing to the stop of the raw water pump 6, the pressure of the supercritical fluid 13 from the supercritical fluid pump 8 becomes higher than the pressure of the treated water from the tower, and the inflow water 103 to be treated is forced back into the tower 1 by the supercritical fluid 13. Then, when the inflow water 103 to be treated subsides below the water level B, which is detected by a sensor 102, as shown in FIG. 2(b), the raw water pump 6 is started again.

In the method wherein the backflow is prevented by using a usually used check valve, the hindrance due to the above-mentioned clathrate compounds occurs, and thereby the check valve itself or the pump fails to function, in some cases. Thus, in FIGS. 2(a) and 2(b), the detector for detecting the amount of the backflow and the raw water pump are correlatively operated, which is a preferable embodiment, although other methods can be employed, for example, by monitoring and adjusting the balance between both pressures.

In the method and the apparatus of the present invention, the countercurrent contact between the water to be treated and the supercritical fluid is carried out in the continuous phase of the water to be treated that is formed preferably almost throughout the inside of the tower. As a result, the method and the apparatus of the present invention are high in treatment efficiency and can treat a large amount of wastewater in a short period of time. Further, by adjusting the cross-sectional area of the continuous phase of the water to be treated, the convection of the water to be treated is prevented, to improve the treatment efficiency. By dividing the inside of the tower by slender columns, to form a group of phases of the water to be treated whose cross-sectional area is adjusted, and by dispersing the supercritical fluid finely and uniformly by stirring it, the treatment efficiency can be further improved.

According to the method of the present invention, the water to be treated and the supercritical fluid are brought in countercurrent contact with each other efficiently, and a large amount of wastewater containing chemical substances can be treated in a short period of time. According to the method of the present invention, organic compounds or the like that are difficult to decompose with microorganisms can be separated from the wastewater without decomposing them, and therefore there is no risk of secondary pollution due to decomposition of compounds. Further, medium-concentration wastewater, whose physical treatment and chemical treatment are hitherto not effective, can be treated directly without pretreatment, such as concentration, and therefore the treatment cost can be reduced greatly. Therefore, according to the apparatus for treating wastewater of the present invention that uses this method, wastewater containing chemical substances at a medium concentration can be treated directly and efficiently at a low cost, and a large amount of wastewater can be treated.

EXAMPLES

Example 1

By using the apparatus for treating wastewater containing chemical substances shown in FIG. 1, wherein the tower comprises one slender column having a diameter of 20 mm and a length of 4,260 mm, an aqueous solution, containing nitrobenzene in an amount of 400 mg/liter, was treated with supercritical carbon dioxide, at a treatment temperature of 35° C., under a pressure of 100 kg/cm$^2$. The supercritical carbon dioxide was supplied into the slender column with the supercritical carbon dioxide bubbled finely.

The treatment was carried out with the SV value being 4.0 and the S/F value being 1.1. Analysis of the treated water showed that the nitrobenzene in the aqueous solution was 100% removed.

Meantime, when the operation was carried out using only the check valve without operating the backflow-preventive apparatus with the S/F value being 1.0, the water to be treated flowed back from the bubbling port of the supercritical fluid toward the pump, and clathrate compounds formed by the reaction between the supercritical carbon dioxide and the water to be treated hindered the function of the check valve of the pump, to not allow pressurization by the pump. When the backflow-preventive apparatus was operated, such a problem did not occur.

Example 2

The treatment of the aqueous nitrobenzene solution was carried out in the same manner as Example 1, except that the tower comprising a slender column having a diameter of 50 mm and a length of 4,260 mm was used. Analysis of the treated water found that the nitrobenzene in the aqueous solution was 100% removed.

Example 3

The treatment was carried out in the same manner as Example 1, except that the wastewater to be treated was changed to an aqueous solution containing o-nitrophenol in an amount of 100 mg/liter, with the SV value being 1.5 and the S/F value being 1.0. Analysis of the treated water found that the o-nitrophenol in the aqueous solution was 100% removed.

Example 4

The treatment was carried out in the same manner as Example 1, except that the wastewater to be treated was changed to an aqueous solution containing trichloroethylene in an amount of 500 mg/liter, with the SV value being 1.5 and the S/F value being 1.0. Analysis of the treated water found that the trichloroethylene in the aqueous solution was 100% removed.

While in Examples 1 to 4, the treatment was carried out by using an apparatus having a tower comprising a single slender column, when the tower comprising a plurality of slender columns is used, supercritical carbon dioxide is fed into the respective slender columns by stirring means provided as required, and the same countercurrent contact as that in Examples 1 to 4 is carried out in the respective slender columns. Thus, when a tower comprising a plurality of slender columns is used, the amount of the raw water to be supplied and the amount of the supercritical fluid to be supplied are increased in conformity with the number of columns, the removal rate of chemical substances in the wastewater is the same as that in Examples 1 to 4, and the treatment rate is increased in conformity with the number (the cross-sectional area of the tower) of columns.

Having described our invention as related to the present embodiments, it is our intention that the invention not be limited by any of the details of the description, unless otherwise specified, but rather be construed broadly within its spirit and scope as set out in the accompanying claims.

What we claim is:

1. A method of treating wastewater containing chemical substances, comprising passing, into a continuous phase of water to be treated that has been formed by supplying raw water from an upper part of a tower, a supercritical fluid, from a lower part of the tower, to the upper part thereof, to bring the water to be treated and the supercritical fluid in countercurrent contact with each other, thereby separating the chemical substances from the water to be treated, wherein the tower comprises a plurality of slender columns and has longitudinally therein at least one slender column with a cross-sectional area of 30 $cm^2$ or less.

2. The method of treating wastewater containing chemical substances as claimed in claim 1, further comprising stirring the supercritical fluid in the lower part of the tower.

3. The method of treating wastewater containing chemical substances as claimed in claim 1, further comprising detecting and preventing any backflow of the water to be treated from the tower in the supply of the supercritical fluid.

4. The method of treating wastewater containing chemical substances according to claim 1, wherein said supercritical fluid is selected from the group consisting of carbon dioxide, dinitrogen oxide, carbon disulfide, ethane, ethylene, and propane.

5. The method of treating wastewater containing chemical substances according to claim 4, wherein said supercritical fluid is carbon dioxide.

6. The method of treating wastewater containing chemical substances according to claim 1, wherein the tower has longitudinally therein at least one slender column with a cross-sectional area of 2 to 20 $cm^2$.

7. The method of treating wastewater containing chemical substances according to claim 6, wherein the tower has longitudinally therein at least one slender column with a cross-sectional area of 4 to 10 $cm^2$.

8. An apparatus for treating wastewater containing chemical substances, which comprises a tower, in which tower raw water can be supplied from an upper part thereof, a supercritical fluid can be supplied from a lower part thereof, treated water can be discharged from the lower part, and the supercritical fluid containing chemical substances can be discharged from the upper art, and which comprises a means capable of controlling the water level in the tower to a certain level, wherein the tower can form therein a continuous phase of water to be treated, and the water to be treated in the form of the continuous phase and the supplied supercritical fluid are brought in countercurrent contact with each other, thereby separating the chemical substances from the water to be treated, wherein the tower comprises a plurality of slender columns and has longitudinally therein at least one slender column with a cross-sectional area of 30 $cm^2$ or less.

9. The apparatus for treating wastewater containing chemical substances as claimed in claim 8, further comprising a means of stirring the supercritical fluid in the lower part of the tower.

10. The apparatus for treating wastewater containing chemical substances as claimed in claim 8, further comprising a means of detecting and preventing any backflow of the water to be treated from the tower, to a pump for supplying the supercritical fluid, in the supply of the supercritical fluid.

11. The apparatus for treating wastewater containing chemical substances according to claim 8, wherein the tower has longitudinally therein at least one slender column with a cross-sectional area of 2 to 20 $cm^2$.

12. The apparatus for treating wastewater containing chemical substances according to claim 11, wherein the tower has longitudinally therein at least one slender column with a cross-sectional area of 4 to 10 $cm^2$.

* * * * *